Figure 1:
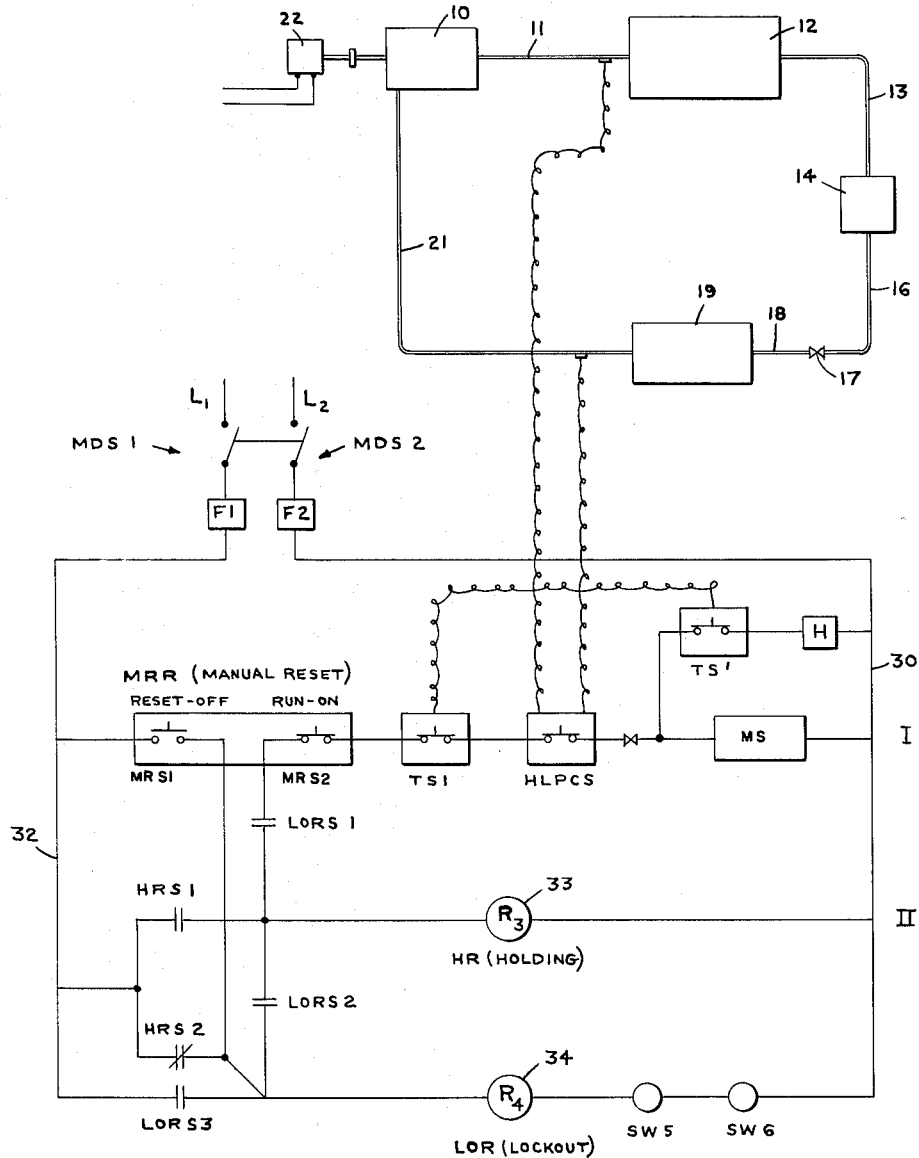

BRUCE M. PAUL
INVENTOR.

BRUCE M. PAUL
INVENTOR.

BY Daniel H. Bobis
Atty

United States Patent Office 3,259,826
Patented July 5, 1966

3,259,826
CIRCUIT FOR AUTOMATICALLY RESTARTING A COMPRESSOR MOTOR AFTER A POWER FAILURE
Bruce M. Paul, Belleville, N.J., assignor to Worthington Corporation, Harrison, N.J., a corporation of Delaware
Filed June 29, 1964, Ser. No. 378,737
1 Claim. (Cl. 318—454)

This invention relates to a motor control circuit for a refrigeration system having a motor driven compressor furnishing hot compressed refrigerant gas.

Refrigeration compressor motors as contemplated in the invention are of necessity provided with sufficient protection to avoid damaging of the motor due to abnormal conditions imposed thereon. Such conditions could result in either overloading of the motor, leading to a burn-out of internal parts, or damage to internal parts which could result in fire or other serious damage. Among the safety devices incorporated in the normal refrigeration system are switches, detectors and the like which given an indication when some malfunction in the compressor occurs, thereby disconnecting the motor from the power source. Supplementary to such indication, the compressor motor is not only disconnected from the electric source, but also out of the control circuit to avoid inadvertent restarting.

The control circuit is further provided with reset means for restarting the motor at such time as the abnormal condition causing the stoppage is determined and/or corrected. The normal motor reset or restarting device consists generally of a switch or relay arrangement positioned in the immediate vicinity of the motor such that the latter may only be restarted manually by a workman or repairman after he has corrected the defect which caused the motor stoppage.

As a matter of safety, it is convenient to position the restart device either directly on the motor casing or immediately adjacent thereto. In either event, it is preferably within reach of an operator working on the motor.

In the instance of a compressor unit positioned at a remote or inaccessable location, it is often inconvenient for operating personnel to get to the motor to ascertain the reason for a stoppage. More specifically, in the instance where the motor compressor is located at the top of a structure or at an inconvenient part of a building, a repairman is often exposed to physical danger merely in getting to the unit.

Where there has been some damage or fault effected in the motor, it is of course necessary to either repair or replace the unit before restarting. Thus, in such an instance, it is necessary to obtain access to the unit in order that it may either be removed or worked on to replace defective parts.

Often, however, compressor motor stoppage results not from a defect in the components thereof or in associated circuits, but rather by interruption of the power being supplied to the motor. For example, during inclement weather, such as a thunder storm or the like, it is not unusual for a compressor motor to be interrupted several times within a short period due to interruption of the power supply, or due to a breakdown at the power source.

When motor stoppage results from a power discontinuance, it is entirely unnecessary for a repairman to go to the unit itself to restart manually by actuation of the restart switch. Such restarting can be as readily effected from a point remote from the motor. A disadvantage to remote restart mechanism however is rather clear. If the motor is restarted in such manner, unless the stoppage resulted from a power failure, the motor may be damaged more severely or even permanently if the fault has not been corrected before current is applied to the starting coil.

To provide a solution to the above problem of compressor motor stoppage, the present circuit overcomes the need for manual restarting after a power failure, and yet does not by-pass the normal safety features built into the motor for protection purposes. The present circuit is designed specifically to permit automatic restarting of a compressor only at those times when motor stoppage has resulted as a direct cause of a power failure.

The circuit is adapted to by-pass the normal restarting switch or relay, yet prohibit automatic restarting of the motor should the latter be stopped due to a malfunction or defect in motor components. Thus, the present convenient feature of automatic motor restarting does not lessen the degree of protection afforded to the motor by in-built, overload switches and the like.

Specifically, the present control circuit is shown cooperative with a refrigeration system having the normal motor driven compressor, a condensor, an evaporator, and a receiver connected to define a closed system. The compressor includes a drive motor positioned within a hermetic casing having inlet and outlet means for passing vaporized refrigerant through the casing to cool motor parts. The unit is electrically connected through a magnetic starter to a source of alternating line current. The control circuit regulating current flow to the compressor, includes (a) switch means to manually restart the motor after the latter has been stopped, (b) means to interrupt the motor in the eventuality of defect occurs in the motor structure, and (c) means to automatically start the motor after a stoppage thereof due to a failure in the power supply to the motor, said automatic restart means serving to by-pass the normal manual reset switch.

It is therefore an object of the invention to provide a refrigeration system having an electrical control means to automatically restart the compressor motor after a stoppage thereof due to a power failure.

A further object of the invention is to provide a motor control circuit for automatically restarting a motor after a power failure has been corrected.

A still further object is to provide a compressor motor control circuit including both manual and automatic restart devices, the former being by-passed by the automatic restarting device in such a manner to avoid short circuiting any of the usual motor protection devices in the circuit.

These and other further objectives of the invention will become clear to those skilled in the art from the following description made in conjunction with the accompanying drawings.

FIGURE I is the diagrammatic view of a refrigeration system and includes a schematic of the electrical circuit for controlling the same.

FIGURE II is a schematic diagram of a control circuit similar to that shown in FIGURE I with the additional feature of a time delay device connected into the circuit.

Referring to FIGURE I, an embodiment of the control circuit is shown connected into a refrigeration system forming a closed cycle. Said system includes a compressor 10 having a discharge connected through line 11 to a condensor 12. Hot refrigerant gas condensed in the latter to liquid form is carried through line 13 and deposited in receiver 14. In the latter, saturated liquid refrigerant is passed through line 16 into an expansion valve 17 after which, expanded refrigerant is introduced through line 18 to the inlet side of the evaporator 19. At the evaporator 19 downstream side, refrigerant gas is carried through line 21 and reintroduced to the suction inlet of compressor 10 to be recompressed and passed through the refrigeration cycle.

Compressor 10 may be of the reciprocating, rotary, or centrifugal type and driven by a motor 22 coupled to the compressor shaft. The motor compressor unit shown in FIGURE I, may be of the open type wherein said motor and compressor units are separated, alternatively and preferably said motor-compressor unit is enclosed within a unitary hermetic casing which is connected into and forms an integral part of the closed refrigeration cycle.

The motor identified in the schematic drawing MS, includes the usual rotor-stator construction having energizing windings to be connected to a source of electric current.

The power lines L1 and L2 are connected to the control circuit through switches MDS1 and MDS2 indicated as a double pole single throw switch and fuses F1 and F2.

A high-low pressure cut-out switch HLPCS is connected to the motor MS and is responsive through sensing means to conditions within the refrigeration system to regulate the motor. HLPCS is a form of safety device interposed in the line, and opens the motor control circuit at such time as the minimum system pressure or a maximum pressure are exceeded for the purpose of shutting off the drive motor.

Switch TSI in the circuit is connected in series with HLPCS switch and provides a further safety disconnect in the eventuality the oil supply in the compressor crankcase becomes exhausted. TSI includes a thermally responsive means to permit a time delay in the opening of the motor circuit at such time as an oil shortage is indicated. Switch TSI is connected through sensing means to a second switch TS' which is connected in series with a heater element H. Functionally, switch TSI is responsive to heat from heater H, being adjusted to open after a predetermined period of being heated. TS' is responsive to oil pressure in the compressor, and will adjust to a closed position when a low, or insufficient oil pressure is sensed in the compressor crankcase, thereby actuating heater element H which in turn affects TS as noted above. When oil conditions in the compressor are normal, TS' will remain open and TSI will be closed to initiate operation of the compressor.

Manual re-set device MRR is connected into the motor circuit for restarting and stopping the motor as desired. MRR consists essentially of a pair of switches MRS1 and MRS2 so interlocked that such said switches cannot simultaneously assume the same position. Switch MRS2 is connected to switches TSI, and HLPCS, and motor MS to line 30. Normally MRS2 is in the open position, however to close the motor circuit when power is applied to L1 and L2, switch MRS2 is depressed to the "run-on" position, and connects line 30 through switches LORS1 and HRS1 to line 32 in a manner to be hereinafter noted.

Holding relay HR includes an energizing coil 33 connected at one side to line 30, and actuates a plurality of switches HRS1 and HRS2, the latter being in the normally closed position, and HRS1 being normally open. HRS1 and HRS2 are connected with a mutual terminal, the remaining terminal of HRS1 being connected to switch LORS1 and to the energizing coil 33 for the purpose of maintaining relay HR coil 33 in the energized position.

Switches SW5 and SW6 are connected in series in the circuit with lockout relay LOR, having one terminal of energizing coil 34 connected to switch SW5, and the other terminal of coil 34 connected through switch LORS3 to line 32. The circuit is thus completed through energizing coil 34, switches SW5 and SW6.

LOR relay includes three normally open switches LORS1, LORS2 and LORS3 which are actuated to the closed position when current is applied initially through switch HRS2 to the energizing coil 34, switches SW5 and SW6, to initiate actuation of the circuit prior to closing of switch MRS2 to the compressor motor. Switches SW5 and SW6 are representative of an additional safety means incorporated into the compressor motor. The switches are actuated by thermal means normally positioned within the motor windings or within the motor casing to sense the temperature therein, and actuate switches SW5 and/or 6 to the open position at such time as the temperature within the motor exceeds a predetermined safe limit.

*Operation of the system*

Assume all safety switches to be closed, that is TSI, HLPCS, SW5 and SW6. MRS1 is set to the "re-set-off" designation, i.e.: MRRS1 is closed. Power is supplied from lines L1, and L2 by closing the disconnect switches MDS1, and MDS2 thereby passing the current from fuses F1 and F2 through the circuit. Coil 34 of the LOR relay is energized by the circuit formed at line 32 and the closed contacts of HRS2 through switches SW5 and SW6 to line 30. Energizing of coil 34 closes contact switches LORS1, LORS2, and LORS3.

The holding relay circuit is closed through HRS2, LORS2 and the energizing coil 33, of the holding relay HR, thereby closing HRS1 to complete the circuit through the coil 33. In this condition although relays HR and LOR are energized, power is not as yet supplied across the motor energizing windings until switch MRS2 is closed. Manual closing of the switch MRS2 then completes a circuit from line 32 through closed HRS1, LORS1, MRS2, TSI, and HLPCS, through the motor MS to line 30.

The motor 30 connected to the current source will continue operating until and unless some defect occurs which would open any of the safety switches such as the internal devices including switches SW5 and SW6 or the external switches associated with the compressor and the refrigeration system, that is TSI and TS' and HLPCS.

The system will now operate until interrupted in response to a lessening of the load requirements at the refrigeration evaporator or until the system is closed down. In the event of a power failure, however, such as at the power source or at an intermediate line transmission, switches MDS1 and MDS2 will remain closed although no current is supplied to the circuit through L1 and L2. Relay coils 33 and 34 of HR and LOR respectively will be deenergized thereby returning the contacts of said relays to the position shown in FIG. I.

Assuming there be no defect in the motor or in the refrigeration system as to actuate any of the safety switches to an open position, when power is again restored to the system through closed switches MDS1 and MDS2 relay LOR will be actuated by energizing of coil 34 through closed switch HRS2. Sequentially, the motor MS circuit will be closed through contact HRS1 and LORS1 and still closed MRS2. Thus, power to motor MS has been restored with no alternation in the setting or position of the manual reset switch MRR.

In the eventuality that concurrently with a power failure interrupting current feed to the circuit, one of the safety switches is opened, the present bypass arrangement will be ineffectual to restart the motor even though power is restored through lines L1 and L2. For example, if a condition arising within motor MS causing excessive heating of the coil or the casing, switch SW5, SW6, or both will open. So long as SW5 or SW6 remain in the open position, the circuit energizing coil 34 cannot be completed and consequently contacts LORS1 and LORS2 will remain in the open position thereby locking the motor circuit in open position. Similarly, if a defect arises in the refrigeration system such that switch TSI or HLPCS opens, power likewise will be held from compressor motor MS.

For example, if power is restored through lines L1 and L2, coil 34 of LOR will be energized through the normally closed switch HRS2. Current then flows to the motor MS circuit through switch HRS1 and LORS1 and MRS2. However, since either of the safety switches TSI or HLPCS is open, the motor circuit again will fail to be closed and consequently the motor will fail to start until such time as the cause for the stoppage has been determined.

Where it becomes necessary to repair either the motor MS or members cooperative therewith, that is subsequent to a stoppage resulting from opening of one of the safety switcches, the reset off switch MRS1 is closed thereby opening MRS2 which holds the motor circuit open.

After necessary repairs have been made, if power is still applied to the circuit through lines L1 and L2, it is necessary only to close MRS2 thereby opening MRS1, to initiate current flow to the motor circuit and to motor MS.

Figure 2:
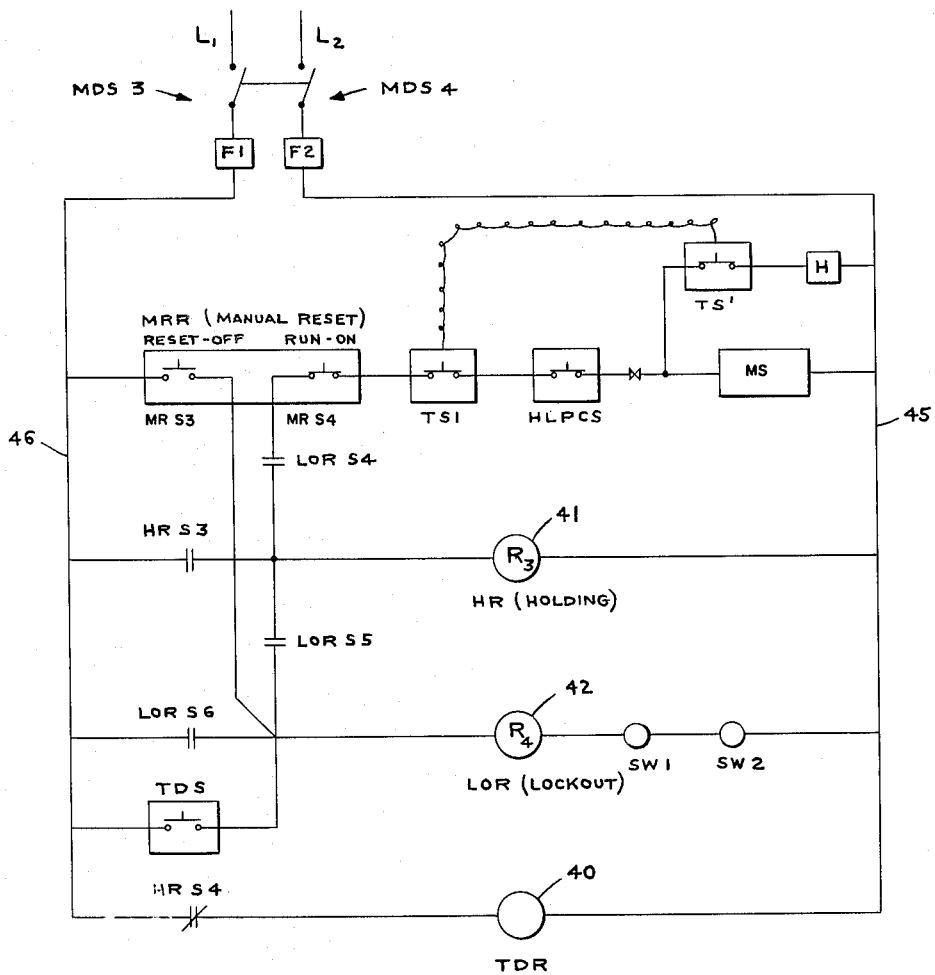

An alternate embodiment of the disclosed arrangement is shown in FIG. 2 and includes basically the elements as shown in the circuit of FIG. 1 with the addition of a time delay member including a time delay relay TDR having an energizing coil 40 and a single time delay switch TDS.

The motor circuit including motor MS includes high-low pressure cutout switch HLPCS, connected in series with a temperature responsive switch TS and with switch MRS4 of the manual reset switch MRR.

A second circuit includes a holding relay HR having holding relay coil 41 connected in series with holding relay switch HRS3 which energizes the coil 41 when said switch is in the closed position. A lockout relay LOR is connected through switches SW1 and SW2 to line 45, and through contact of LORS6 to line 46 when switch LORS6 is in the closed position.

Normally open switches LORS4 and LORS5 connect through LORS6 and when coil 42 of LOR is energized close the circuit supplying current through switches MRS4, TSI, and HLPCS, to motor MS.

The time delay circuit in the system includes a time delay relay TDR having coil 40 connected at one side to line 45 and through normally closed switch HRS4 to line 46 for passing current through coil 40. TDR may be a relay of the standard type having a timer mechanism actuated through a timer motor to close contacts of switch TDS after a predetermined time from the energization of coil 40. TDS switch is connected to line 46 and to switch LORS5 and LORS4 to complete the circuit through motor MS at such time as TDS switch is closed.

*Operation of the system*

To initially start the compressor motor it is not necessary to pass through the time delay relay. The procedure is as follows:

With switches MDS3 and MDS4 closed, power is applied to time delay relay coil 40 through closed switch HRS4. This time delay previously mentioned may be a matter of minutes and may be set for as long a delay as desired. In order to by-pass time delay circuit, switch MRS3 is closed thereby closing the circuit from line 46, through lockout relay coil 42, switches SW1 and SW2 to energize coil 42.

Energization of coil 42 closes switches LORS4, LORS5, and LORS6, thereby closing the circuit through LORS6, LORS5 and coil 41 of the holding relay. Energization of coil 41 closes switch HRS3 connected to a terminal coil 41 thereby holding the latter in a closed position. Simultaneously, normally closed HRS4 is opened and interrupting the time delay relay 40, whose cycle is self-resetting. With both the holding relay HR and the lock-out relay LOR actuated, switch MRS4 is closed thereby completing the circuit through LORS6, LORS5, LORS4, MRS4, TSI, HLPCS, and through motor MS.

When an interruption in the current supply to L1 and L2 occurs, power will of course be removed from the entire circuit and motor MS will be de-energized, as well as relays HR and LOR. A primary purpose of inserting the time delay element in the present circuit is to avoid rapid cycling or recycling of the compressor in response to an unsteady power supply.

To avoid frequent starting and stopping of the compressor until a steady source of power is restored, the present time delay element is connected to control the starting up of the compressor automatically, after power is restored. The need to avoid rapid cycling of the compressor is well known since such recycling tends to overwork and eventually damage the motor energizing coils if not compensated for.

Thus, where power failure in lines L1 and L2 have caused the circuit to close down the characteristics of the time delay relay are adjusted for the predetermined length of time. With power restored at lines L1 and L2, the time delay relay circuit including coil 40, is closed through contact HRS4. During the timed delay, time delay switch TDS remains open and at the end of the delay period said switch TDS is closed.

Closing of switch TDS completes the circuit through said switch, and locking relay LOR coil 42, which in turn closes switches LORS4, LORS5, and LORS6. Simultaneously coil 41 of the holding relay HR is energized thereby closing holding relay switch HRS3 to maintain the holding relay in the energized position. As the holding relay HR coil 41 is energized, HRS4 is actuated to an open position thereby breaking the circuit through timer TDR and permitting the latter to return to its original starting position. The motor circuit is now completed through switches HRS3, LORS4, MRS4, TSI, HLPCS and motor MS.

As in the instance of the previously described circuit of FIG. 1, if the motor stoppage is due to power failure at lines L1 and L2, the compressor motor may be restarted without actuating the reset switch MRS3. In the circuit described in FIG. 2 however, switch MRS3 serves the additional function not only of restarting the circuit manually, but also of bypassing the protective feature of the time delay period before initiation of the compressor motor startup.

The advantages of a time delay device as presently described can readily be appreciated in the instance wherein several compressors are connected to a power source. The respective units are preferably set to commence operation after time delay cycles of different duration. Thus, after a power failure, and current is again applied to the motor lines, the motors will start up in sequence rather than simultaneously and thus avoid application of an excessive load which would tend to actuate circuit breakers and the like.

It is clear from the foregoing descriptions of the embodiments of the invention that there is provided a novel compressor motor control device which in effect protects an entire refrigeration system. The motor is assured adequate protection by use of internal members, and simultaneously affords the desirable feature of being automatically restarted only in those instances when stoppage is due to an interruption in line current to the motor circuit.

Although we have described the circuit with respect to a particular refrigeration system involving a compressor and associated components, it is clear that the novel circuit may be applied as well to other control circuits without similar departing from the spirit and scope of the invention.

What is claimed is:

A control system for a refrigeration system having a refrigerant compressor and a drive motor therefor, said control system being operative to automatically restart said compressor drive motor subsequent to stoppage thereof due to a discontinuance of electrical power supplied to said drive motor, which control system includes:
(a) a compressor drive motor adapted to be connected to a source of electrical power;
(b) switching means operative to connect and disconnect the source of electric power to and from said drive motor;
(c) safety means including a safety switch operable to connect and disconnect said motor to and from the source of power, said safety means including pressure sensing switches and motor heat sensing switches each individually operable to connect and disconnect said motor and from the source of power when an abnormal condition is sensed;
(d) manual starting means operative, upon closing of switch contacts, to energize said switching means to initiate operation of said motor;
(e) said manual switching means and said safety means being operative to maintain their state of operation upon failure of the source of electrical power, said switching means being operative to disconnect said motor from said source of power upon loss of electrical power;
(f) time delay means, said time delay means being operative to delay energization of said switching means to reconnect the drive motor to the source of power when electric power is available after a stoppage thereof subject to the safety means and manual switching means being in their motor connect position; and
(g) a manually resettable by-pass means, said manually resettable by-pass means being associated with said manual switching means to by-pass said time delay means and immediately reconnect said drive motor to the source of power when electric power is available after a stoppage thereof.

References Cited by the Examiner
UNITED STATES PATENTS

| | | | |
|---|---|---|---|
| 2,697,195 | 12/1954 | Courtney | 318—452 |
| 2,818,535 | 12/1957 | Skeats et al. | 318—452 X |
| 3,142,013 | 7/1964 | McGrath et al. | 318—471 |
| 3,192,463 | 6/1965 | Kyle | 318—473 |

ORIS L. RADER, *Primary Examiner.*

J. C. BERENZWEIG, *Assistant Examiner.*